J. R. Webster.
Straining Wood Saws.
Nº 73413    Patented Jan. 14, 1868.
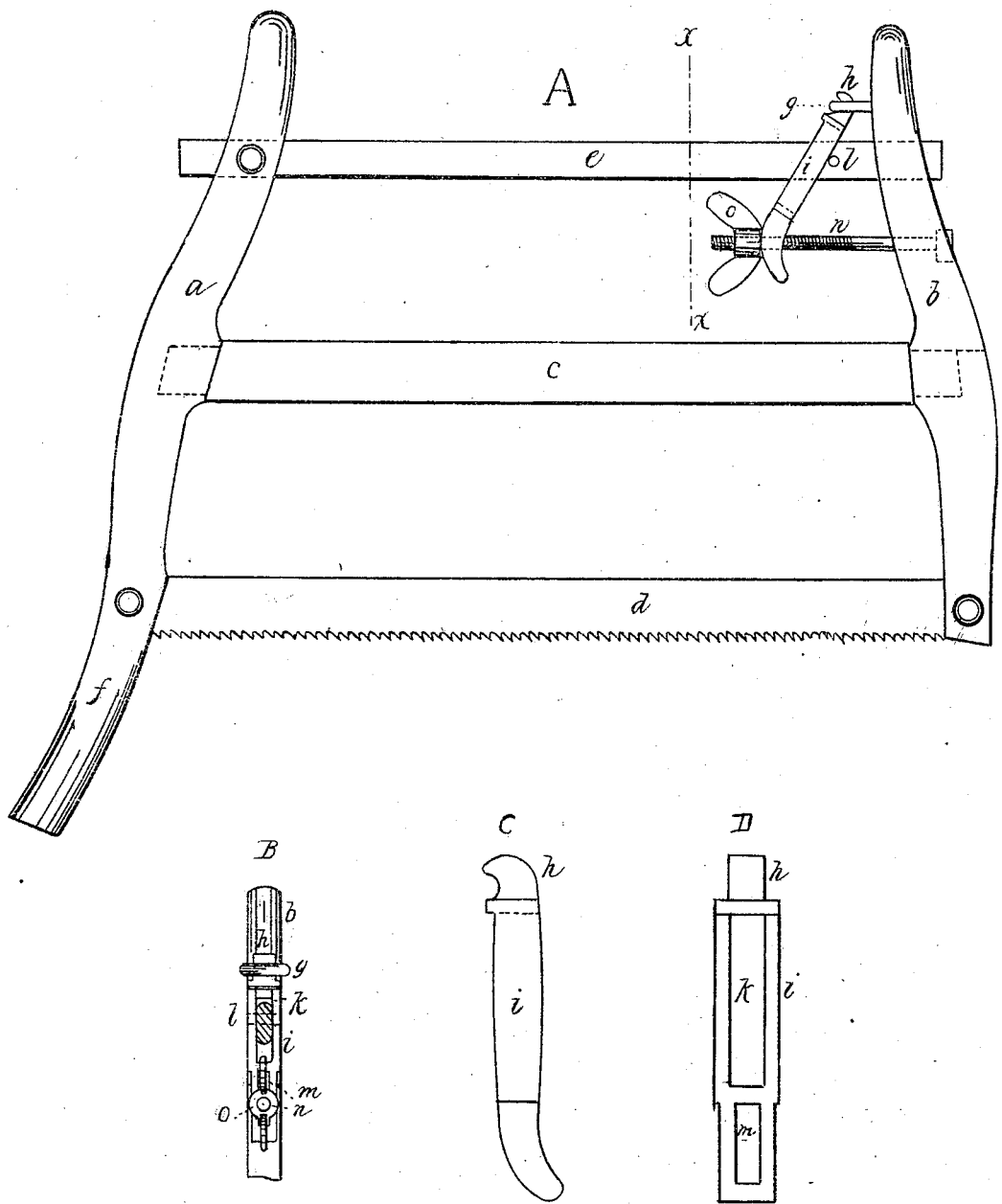
Witnesses:    Inventor:

United States Patent Office.

JOSEPH R. WEBSTER, OF BOSTON, MASSACHUSETTS.

*Letters Patent No. 73,413, dated January 14, 1868.*

IMPROVEMENT IN MODE OF STRAINING WOOD-SAWS.

*The Schedule referred to in these Letters Patent and making part of the same.*

TO ALL WHOM IT MAY CONCERN:

Be it known that I, JOSEPH R. WEBSTER, of Boston, in the county of Suffolk, and State of Massachusetts, have invented an Improvement in Straining Saws; and I do hereby declare that the following, taken in connection with the drawings which accompany and form part of this specification, is a description of my invention sufficient to enable those skilled in the art to practise it.

The invention relates to the straining of saws, and more particularly to mechanism for straining the blades of the common and well-known wood-saws, in which the blade is hung in a square or quadrangular frame, one end-bar of which forms, or has formed upon it, the handle for driving the saw.

Various devices have been designed, and are now more or less in use, as substitutes for the old method of straining the blade by twisting a doubled cord, connecting the upper ends of the two main bars of the frame, descriptions of some of which devices may be found in United States Patents Nos. 25,015, 29,991, 30,073, 30,076, (reissue 1,452,) 37,999, and 68,194. These devices are, all of them, more or less objectionable, either for want of simplicity, or on account of inefficiency, or because too expensive.

In my invention I have sought to produce a mechanism or device for straining the blade, which, while being very simple and inexpensive, should permit the saw to be strained with the greatest facility, and to any desirable degree of tautness.

My invention consists, primarily, in the employment, in connection with a bow or frame of a hand-saw, of a lever connected at one end to the saw-frame bar, and hung upon or with relation to a fulcrum-pin in such manner that a screw and nut operating upon the opposite end of the lever, causes the lever either to operate directly upon the saw-blade with relation to one of the frame-bars, and thereby strain the blade, or to operate upon the frame-bar with relation to one of the braces, or *vice versa*, and thereby effect the same object.

The drawing represents, at A, a side view of a common wood-saw and frame embodying my invention. B represents a section taken on the line $x\ x$. C and D are side and front views of the straining-lever. $a$ and $b$ denote the two end-bars, $c$ the centre-brace, $d$ the saw-blade, and $e$ the upper brace, the general relative disposition of these parts being the same as in other frames. One end of the brace $e$ is secured to the bar $a$ by a pin, while its opposite end slides freely through a mortise in the bar $b$; and on the inner side of one of the bars $a$ $b$, (preferably the bar $b$, opposite to the handle $f$,) and just above the brace $e$, is a ring-bolt, $g$, (or a staple,) into the eye of which the upper end, $h$, of a lever, $i$, hooks, as seen at A and B. This lever (which is formed substantially as seen at C and D) has a long mortise, $k$, made through it, by means of which the lever is slipped upon the upper brace, as seen at A and B, the lever resting, when applied, against a fulcrum-pin, $l$, inserted in and projected from the brace. Another mortise, $m$, (or an extension of the same mortise,) is made in the lower end of the lever, and through this a screw or screw-pin, $n$, projects, this pin being driven through the adjacent bar $b$, its head bearing upon the outer surface of said bar. On the outer or threaded end of the screw-pin is a nut, $o$, which, in being screwed up on the screw, presses against the lever $i$, as will be readily understood by inspection of the drawing at A. As the end of the lever is thus forced towards the bar $b$ by the nut, its opposite end draws the upper part of the bar towards the fulcrum-pin, forcing the lower end of the bar outwards, and thereby straining the saw-blade.

As the lever is loosely connected, both to the bar $b$ and to the brace $e$, it will be obvious that no relative strain comes upon the bar and brace, but that they move freely, both with respect to each other and to the lever. The straining-device may thus be applied to either bar $a$ or $b$, or may be applied to the outer surface of either bar, and a similar lever-mechanism may also be similarly applied with respect to the centre-brace, or even so as to operate directly upon the blade, but the specific arrangement shown is considered the most desirable and practical for wood-saws.

In applying the lever to bow-saws, and directly to or in connection with the blade of common wood-saws, the lever is pivoted both to the end of the bow-bar and to the saw-blade, or works against pivots applied to each, this lever having, in such case, a neck, which is embraced by the frame, a fork below such neck, which straddles the blade, and a mortise above the neck, made for the screw to work through.

Among the advantages of this method of straining saws may be mentioned the following: Both ends of the brace $e$ pass completely through both end-pieces $a\ b$ of the saw-frame in all degrees of strain, thus preserving its symmetry and giving to it always a firm support. The brace *e* is not liable to be bent in the operation of straining the saw. By combining the screw with the lever, great straining-power is obtained, the degree of strain may be finely adjusted and securely maintained, while the tension upon the threads of the screw is only a part of the strain which is exerted upon the frame.

The lever may be made without the mortise *k*, being, in such case, placed on one side of the brace; but it will be obvious that such arrangement is not so reliable as that in which the brace is carried directly through the lever, as shown.

I claim, in combination with a hand-saw frame, the lever *i*, and mechanism by which it is connected with the frame, and is operated to strain the saw-blade, substantially as set forth.

JOSEPH R. WEBSTER.

Witnesses:
 FRANCIS GOULD,
 S. B. KIDDER.